(12) United States Patent
Kremer et al.

(10) Patent No.: US 8,501,255 B2
(45) Date of Patent: Aug. 6, 2013

(54) PARTICULATE COMPOSITION COMPRISING CALCIUM LACTATE AND CALCIUM CITRATE MICROPARTICLES

(75) Inventors: Diderik Reinder Kremer, Groingen (NL); Jildert Eelke Visser, Assen (NL); Marcus Johannes Anthonium Wilhelmus Vorage, Balloo (NL)

(73) Assignee: Purac Biochem B.V., Gorinchem (NL)

( * ) Notice: Subject to any disclaimer, the term of this patent is extended or adjusted under 35 U.S.C. 154(b) by 43 days.

(21) Appl. No.: 12/000,168

(22) Filed: Dec. 10, 2007

(65) Prior Publication Data

US 2008/0152764 A1 Jun. 26, 2008

Related U.S. Application Data

(60) Provisional application No. 60/874,726, filed on Dec. 14, 2006.

(51) Int. Cl.
*A23L 1/216* (2006.01)
*A23L 1/30* (2006.01)
*C12H 1/04* (2006.01)

(52) U.S. Cl.
USPC ............... 426/96; 426/74; 426/422; 426/648

(58) Field of Classification Search
USPC .............. 426/74, 590, 575, 580, 96, 422, 648
See application file for complete search history.

(56) References Cited

U.S. PATENT DOCUMENTS

| | | | | |
|---|---|---|---|---|
| 5,075,499 A | * | 12/1991 | Walsdorf et al. ............... | 562/590 |
| 5,186,965 A | | 2/1993 | Fox et al. | |
| 6,036,985 A | * | 3/2000 | Jacobson et al. ............... | 426/74 |
| 2006/0121158 A1 | | 6/2006 | Ferruzzi et al. | |

FOREIGN PATENT DOCUMENTS

| | | |
|---|---|---|
| CN | 1237351 A | 12/1999 |
| EP | 0 394 453 A1 | 10/1990 |
| EP | 394453 A1 * | 10/1990 |
| EP | 0 781 756 A1 | 7/1997 |
| EP | 0 875 153 A2 | 11/1998 |
| JP | A-60-087753 | 5/1985 |
| WO | WO 94/08471 A1 | 4/1994 |
| WO | WO 99/51114 A1 | 10/1999 |
| WO | WO 01/22838 A1 | 4/2001 |

OTHER PUBLICATIONS

Oneda et al.; The effect of formulation variables on the dissolution and physical properties of spray-dried microspheres containing organic salts: *Powder Technology*; vol. 130; pp. 377-384; 2003.
Office Action issued in Chinese Patent Application No. 200780045854.X mailed Sep. 16, 2011.

* cited by examiner

*Primary Examiner* — Humera Sheikh
*Assistant Examiner* — Bhaskar Mukhopadhyay
(74) *Attorney, Agent, or Firm* — Oliff & Berridge, PLC

(57) ABSTRACT

The invention pertains to a particulate composition comprising calcium lactate and calcium citrate microparticles having an average diameter from 0.1 μm to 20 μm, wherein the composition is in the form of particles with an average diameter from 25 μm to 1 μm, wherein the ratio by weight of calcium lactate to calcium citrate, based on the dry weight, is 80:20 to 30:70 , and wherein the calcium lactate is a non-polymeric agglomeration agent for the calcium citrate microparticles. The invention further relates to a process for producing the particulate composition wherein an aqueous solution of calcium lactate comprising calcium citrate microparticles is spray-dried to the particulate composition, to the use of the particulate composition as calcium-enhancer, and to alimentary products.

18 Claims, No Drawings

PARTICULATE COMPOSITION COMPRISING CALCIUM LACTATE AND CALCIUM CITRATE MICROPARTICLES

This application is a Non-Provisional of the Provisional Application No. 60/874,726, filed Dec. 14, 2006.

The invention relates to a particulate composition comprising calcium lactate and calcium citrate microparticles. The invention also relates to a process for producing such particulate composition to the use of said composition in food and beverages, and to alimentary products.

Compositions containing calcium are commonly used in food and beverages for enhancing their calcium content.

WO 01/22838 to Nestle describes a metastable calcium lactate-citrate complex formed by the interaction of an alkaline calcium source such as calcium hydroxide, calcium oxide, or calcium carbonate with a mixture of lactic and citric acid. The mixture is used to fortify drinks. In the examples the complex is provided in the form of a clear solution.

U.S. Pat. No. 5,186,965 describes a particulate composition which is a metastable calcium citrate malate salt. The composition may be obtained by adding a calcium salt to an aqueous composition of citric acid and malic acid, and drying the reaction mixture, optionally followed by grinding to a particle size below 1 micron.

U.S. Pat. No. 5,075,499 describes a dicalcium citrate-lactate complex which is manufactured by mixing citric acid with a calcium compound, adding lactic acid to the mixture, blending the mixture to provide a hydrate, and drying the hydrate. These compositions are used as dietary calcium supplement, but are not suitable to use in food and beverages.

WO 94/08471 describes a clear liquid sweetener composition comprising concentrated calcium citrate malate. Further calcium may be added to the system using calcium lactate.

WO 99/51114 describes a metastable calcium lactate-citrate complex formed by the interaction of an alkaline calcium source such as calcium hydroxide, calcium oxide, or calcium carbonate with a mixture of lactic and citric acid. The mixture is used to fortify drinks. In the examples the complex is provided in the form of a clear solution.

EP781756 describes a method for manufacturing a soluble concentrated frozen or refrigerated calcium citrate malate preparation. Lactic acid may be used as a source of calcium.

US 2006/0121158 describes a weight management beverage which may contain a calcium source, which may be a calcium lactate citrate. The beverage composition may be provided in dry form.

EP 875153 describes a complex formed of a soluble calcium salt, preferably calcium lactate, and an alkali metal citrate, preferably potassium citrate. The product is believed to be a calcium lactate-citrate complex or a calcium citrate-lactate complex. The complex is in the form of a clear solution.

EP 394453 describes a composition for improving the quality of fish paste which comprises sodium bicarbonate, calcium citrate, and calcium lactate.

F. Oneda et al. (Powder Technology 130 (2003) 377-384) describes compositions of calcium lactate or calcium citrate in the form or particles. The particles are formed by spray drying of calcium lactate solutions and calcium citrate solutions with help of a polymer. This method, however, is not very efficient because calcium citrate can only be spray-dried at low concentrations, which economically is unwanted, and calcium lactate inherently has a low calcium content. Furthermore, this method needs polymers as encapsulating agent, which adds to the cost price and is in many instances not desired in food products, whereas a feed containing calcium citrate in low concentration renders the spray-drying process economically uninteresting.

JP 60087753 describes an indirect method for obtaining a mixture of calcium lactate and calcium citrate. Sodium citrate is added to calcium lactate, which is processed into an aqueous solution of it. This solution is used with a coagulating agent such as calcium chloride, and added to soybean milk. This method does not give particulate material and thus can only be applied at the end user, i.e. the producer of the food or beverage. Needless to say, this method is unsuitable for selling a ready-to-use product and unsuitable for large-scale use.

Various problems are associated with the methods and products described in the art. In the art there is need for a particulate composition containing large quantities of calcium. These compositions should have a particle size which is such that it shows good processing properties, including good flow, and good dosing properties. On the other hand, the composition should also have good dispersion and dissolution behavior. Further, it should be possible to manufacture the composition in a manner which is economically acceptable manner. The composition should be suitable for easy application in beverages and food at industrial scale, and should provide excellent taste and mouthfeel.

It was found that the above problems can be solved by the provision of a particulate composition comprising calcium lactate and calcium citrate microparticles having an average diameter from 0.1 µm to 20 µm, wherein the composition is in the form of particles with an average diameter from 25 µm to 1 mm, wherein the ratio by weight of calcium lactate to calcium citrate, based on the dry weight, is 80:20 to 30:70, and wherein the calcium lactate is a non-polymeric agglomeration agent for the calcium citrate microparticles.

The particulate composition of the present invention has a number of advantages. In the first place, the particle size of the composition is such that it has good powder properties, including good flowability, no dosage problems, and no dusting problems. On the other hand, due to the presence of the calcium citrate in the form of microparticles, the mouth feel of the product is very good. Further, both calcium lactate and calcium citrate are approved for use in food, and the use of a physical mixture of these compounds therefore poses no regulatory problems. This may not be the case for other compositions containing calcium, lactate, and citrate, e.g., calcium lactate citrate complexes. The composition shows a high calcium content. Further, it has been found that the use of the composition according to the invention in food and beverages combines the provision of additional calcium with good taste and good mouthfeel. In one embodiment, the composition is used in beverages based on fruit (fruit juices, etc.) where it was found to provide a particularly good taste. Not wishing to be bound by any theory, it is believed that the good taste and good mouthfeel provided by the product according to the invention are caused by the fact that upon contact with the aqueous environment in the beverage the calcium lactate dissolves, leaving the microparticles of the calcium citrate, which are so small that they do not have the gritty mouthfeel that can occur when larger particles are used. This is also applicable to other foodstuffs.

In a preferred embodiment the composition consist of particles having an average diameter from 50 µm to 150 µm.

The particulate composition comprises calcium citrate microparticles having an average diameter from 0.1 µm to 20 µm, preferably from 1 to 10 µm.

The particles of composition may be in any form such as in the form of amorphous and/or crystalline particles. Suitable crystalline forms include calcium citrate tetrahydrate ($Ca_3(C_6H_5O_6)_2 \cdot 4H_2O$) and calcium lactate monohydrate ($Ca_3(C_3H_5O_3)_2 \cdot H_2O$).

In one embodiment, the composition according to the invention contains less than 10 wt. % of malate, in particular less than 5 wt. % of malate, still more in particular less than 2 wt. % of malate. Even more in particular, the composition is substantially free of malate, that is, if malate is present, it is present as a contaminant in amounts the presence of which cannot be avoided in normal processing. It is believed that the presence of malate may have a detrimental effect on the formation of the calcium citrate microparticles.

In one embodiment, the particulate composition of the present invention consists substantially of calcium lactate and calcium citrate. In this context the wording "consists substantially" means that the composition does not contain other components in amounts which substantially affect the properties or performance of the product. In one embodiment, the composition according to the invention consists essentially of calcium citrate and calcium lactate. That is, in this embodiment the composition only contains other components as contaminants in amounts the presence of which cannot be avoided in normal processing. As will be evident to the skilled person, the presence of water is not excluded by the wording consists essentially of or consists substantially of. The particulate composition according to the invention generally has a water content between 2 and 13%, in particular between 5 and 10%, determined by halogen lamp heating at 115° C. until weight decrease has stopped.

The present invention also pertains to alimentary products which can be obtained using the particulate composition of the present invention. Accordingly, the present invention pertains to an alimentary product comprising the particulate composition of the present invention. Where the alimentary product contains water, e.g., in the case of a water-containing food product or a beverage, at least part of the calcium lactate will dissolve in the water present in the composition. Therefore, the present invention also pertains to an alimentary product comprising calcium citrate microparticles having an average diameter from 0.1 micron to 20 micron and dissolved calcium lactate. The preferences expressed above are also applicable to this embodiment.

Another aspect of the invention relates to a method for making said composition. Although any suitable method for making the particulate composition may be used, it was found that a spray-dry process is very suitable in terms of economical performance and ease of procedure.

A suitable process therefore includes producing the particulate composition wherein an aqueous solution of calcium lactate comprising calcium citrate microparticles is spray-dried to the composition as particles. This method can be optimized and the products can be tuned to have the desired functionality by selecting optimum conditions for temperature, acidity, and high energy mixing applied. Thus preferred conditions to perform this process are using temperatures between 70 and 100° C., most preferably about 85° C. Optimum acidity conditions are usually in the range of a pH 3.5-8.0, most preferably about pH 5.

Alternatively, a start solution can be obtained by mixing lactic acid, citric acid, and calcium oxide, hydroxide, carbonate, and/or hydrogen carbonate. It is also possible to prepare a premix of a lactic acid solution and the required amount of calcium oxide, calcium hydroxide, carbonate, and/or hydrogen carbonate, followed by addition of a citric acid solution.

Preferably, during the mixing in any one of the above-mentioned processes an intense mixing is applied in order to immediately provide supersaturation of calcium citrate in order to minimize the size of the calcium citrate microparticles that precipitate. The mixing of the mentioned solutions or suspensions may be carried out either batch wise or continuously by an in-line system.

Surprisingly, we found that the presence of lactic acid/lactate during the precipitation of calcium citrate, had a favorable effect in the sense that it led to substantially smaller calcium citrate microparticles.

In the case that the micro-particles calcium citrate are not sufficiently small, an extra treatment such as wet-milling or any other particle size reducing method known in the art, may be used to obtain the required particle size.

In the spray-dry process the particles are formed during the spray-dry process. It is usually beneficial to enlarge further the obtained particles (containing the calcium citrate microparticles). Agglomeration processes to obtain larger particles are well-known. It is preferred to apply such agglomeration step during the spray-drying process.

The process of the invention uses an aqueous solution of calcium lactate comprising calcium citrate microparticles. Such starting solutions containing the calcium citrate microparticles can easily be prepared by treating an aqueous solution of lactic acid and citric acid with at least one of the oxide, hydroxide, carbonate, and hydrogen carbonate of calcium. Preferably calcium hydroxide is used. The composition is suitable as calcium-enhancer in food products and beverages, particularly in milk and fruit drinks.

The invention is further illustrated by the following non-limitative examples.

EXAMPLE 1

Preparation of Calcium Lactate Citrate Liquid

To a 1 liter beaker were added the following components: 409 grams of demineralized water, 104 grams of citric acid monohydrate, 117 grams of L-lactic acid 88%. After complete dissolution of the components, approximately 75 grams of solid $Ca(OH)_2$ were slowly added while vigorously stirring the reaction mixture. Stirring conditions were 2000 RPM, with a four-blade impeller, each blade being 2.5 cm.

The $Ca(OH)_2$ was added continuously during less than 5 minutes and the last part was added slowly, in order to adjust the pH of the mixture to approx. 5.0. The pH went from 1.3 to 5.0 during addition of the $Ca(OH)_2$. The temperature increased from room temperature to approx. 75° C. The resulting liquid was white, opaque and slightly viscous.

EXAMPLE 2

Preparation of Calcium Lactate Citrate Liquid

An experiment according to 1 was carried out, with the difference that $Ca(OH)_2$ was added as a suspension in water. The amounts of materials were 100 grams of demineralized water, 118 grams of citric acid monohydrate, 139 grams of L-lactic acid 88%, and 417 grams of $Ca(OH)_2$ 30% w/w suspension. The temperature increased from room temperature to approx. 70° C. The resulting liquid was white, opaque and slightly viscous.

EXAMPLE 3

Preparation of Calcium Lactate Citrate Liquid

A 2 liter, baffled vessel was initially filled with 782 grams of 40% w/w $Ca(OH)_2$ suspension. To this suspension 347 grams of 88% lactic acid diluted with 142 grams of water were slowly added. After reacting, the temperature of this mixture containing dissolved calcium lactate and suspended Ca(OH)$_2$ was 70° C. Subsequently, approximately 437 grams of a solution of citric acid, made by mixing 295 grams of citric acid monohydrate and 142 grams of water, were added to the vessel, while vigorously stirring the mixture. The stirring conditions were 1250 RPM, with two six-blade impellers, each blade being 2 cm.

During the addition of citric acid, the pH was monitored and the citric acid addition was stopped when the pH was decreased to approx. 5.0. The temperature of the final mixture was kept at approx. 80° C. The resulting liquid was white, opaque and slightly viscous.

EXAMPLE 4

Preparation of Calcium Lactate Citrate Liquid

In a vessel, the following liquid (A) was prepared by adding and mixing 32 kg of water, 8 kg of Ca(OH)$_2$ and 9.8 kg of lactic acid 88%. This liquid was kept at 80° C. in order to keep the calcium lactate dissolved and was continuously stirred to keep the excess Ca(OH)$_2$ suspended. In an other vessel a citric acid solution was prepared by adding and mixing 50 kg of citric acid monohydrate and 32 kg of water.

Both liquid A and the citric acid solution were lead by peristaltic pumps to a small mixing chamber (volume 26 ml) containing a high energy mixer device (Ultraturrax UTL 25 basic inline) set at 24,000 RPM. The flow of the citric acid solution was 167 g/minute. The flow of liquid A was set at such a rate that the output of the mixing chamber was adjusted to a pH of 5.0.

The liquid output of the mixing chamber was clear, indicating that all the Ca(OH)$_2$ was dissolved and neutralized. The output of the mixing chamber was collected and turned opaque within seconds, indicating a fast crystallization and/or precipitation of calcium citrate.

The resulting liquid was white, opaque and slightly viscous.

EXAMPLE 5

Preparation of Calcium Lactate Citrate Liquid

A similar experiment was carried out as in example 4. However, vessel A contained a mixture of 144 grams of lactic acid 88%, 123 grams of citric acid monohydrate and 342 grams of water per kg. Vessel B contained a 30% w/w Ca(OH)$_2$ slurry.

The liquid output of the mixing chamber was clear, indicating that all the Ca(OH)$_2$ was dissolved and neutralized. The output of the mixing chamber was collected and turned opaque within seconds, indicating a fast crystallization and/or precipitation of calcium citrate.

The resulting liquid was white, opaque and slightly viscous.

EXAMPLE 6

Spray Drying Calcium Lactate Citrate Liquid

The resulting slightly viscous liquids mentioned above, were either spray dried in a lab spray drier (Lab Plant Spray Drier SD-04) using an inlet temperature of 260° C. and outlet temperature of 93° C., or in a pilot spray drier (Anhydro PSD52) using a co current two fluid nozzle, 3 bar air pressure, inlet temperature 240° C. and outlet temperature 95° C.

Spray drying under both conditions resulted in a fine, white, dry powder.

EXAMPLE 7

Analyses, Particle Size and Composition.
Particle Size:

Particle size was determined by laser diffraction using a Malvern Mastersizer 2000 or a Malvern Mastersizer S Long Bed Ver 2.15. Both were equipped with a dry cell to analyze powders and with a wet cell to analyze suspensions.

In addition, Scanning Electron Microscope (SEM) pictures were made from dry powders.

Particle size of the calcium citrate powder was measured by different methods.

A. The liquid resulting from experiments 1, 2 and 3 were filtered over 0.2 μm. The solid residue on the filter was rinsed with ethanol and dried at room temperature. The resulting powder was measured by dry cell, laser diffraction. HPLC analyses confirmed that the solid residue consisted primarily of calcium citrate, while the filtrate contained primarily calcium lactate. The average particle size—D (v, 0.5)—of the dried residue from experiment 1, 2 and 3 were between 5 and 15 μm. SEM pictures confirmed these observations.

B. Spray dried samples from experiment 1, 2, 3, and 4 were measures by dry cell, laser diffraction. All samples had a D (v, 0.5) between 5 and 15 μm. SEM pictures confirmed these observations. Although these samples contained both calcium lactate and calcium citrate, the particle size is indicative for calcium citrate, since A and B gave similar results.

C. Spray dried samples from experiments carried out as example 4 were dissolved in water resulting in a solution of calcium lactate and a dispersion of calcium citrate. The particle size of the citrate salt was determined by wet cell laser diffraction in a solution of saturated calcium citrate, in order to avoid dissolution of the calcium citrate particles. All samples had a D (v, 0.5)—of between 5 and 15 μm.

D. During an industrial trial, a calcium lactate citrate liquid was dried using a wide-body, agglomerating spray-drier. The resulting aggomerated powder was analysed by sieve fractionation. At least 90 wt. % of the particles had a diameter between 105 and 420 microns. This was confirmed by dry cell laser diffraction. The calcium citrate particle size in this powder was determined by wet cell laser diffraction in a solution of saturated calcium citrate. After dissolution of the calcium lactate, the remaining calcium citrate particles had an average particle size D (v, 05) of 6-7 microns.

Composition of the Laboratory Spray Dried Samples.

Citric acid and lactic acid were determined by HPLC and recalculated as calcium lactate and calcium citrate. A sample produced by the method of example 4 contained 43.6% calcium citrate, 47.2% calcium lactate and 9.4% moisture (halogen drier). Calcium was measured titrimetrically and which appeared to be 18.9%. HPLC showed only a citrate and lactate peak and no further impurities.

EXAMPLE 8

Effect of High Energy Mixing on the Calcium Citrate Particle Size

In a series of experiments carried out as example 2, the intensity of mixing was varied during addition of the Ca(OH)$_2$ suspension, by using different stirring rates. In addition to increase mixing energy in one experiment a high energy mixer (Ultra Turrax T25) was additionally inserted into the vessel. The effect of the different stirring conditions on the particle size is displayed in the Table below.

| Stirring conditions | Average particle size of the ethanol dried residue D (v, 0.5) |
| --- | --- |
| 2000 RPM + Ultra turrax 24000 RPM | 5.1 μm |
| 2000 RPM | 13.3 μm |
| 1000 RPM | 14.2 μm |
| 500 RPM | 28.5 μm |

EXAMPLE 9

Effect of Lactate on Particle Size of Calcium Citrate

In an experiment carried out as example 3, the lactic acid was omitted resulting in the production of pure calcium citrate. The amount of chemicals used were 908 g of water, 443 g of citric acid monohydrate and 265 g of Ca(OH)$_2$. After spray drying the resulting suspension, the particle size was determined by dry-cell, laser diffraction.

The particle size, D (v, 0.5) was 14.3 μm, whereas the sample produced in example 3 had a substantially smaller particle size D (v, 0.5) of 7.5 μm.

The invention claimed is:

1. A particulate composition comprising calcium lactate and calcium citrate,
    wherein the calcium citrate is in the form of calcium citrate microparticles having an average diameter from 0.1 μm to 20 μm,
    wherein the particulate composition is in the form of particles having an average diameter from 25 μm to 1 μm,
    wherein a weight ratio of the calcium lactate to the calcium citrate in the particles, based on dry weight, is 80:20 to 30:70, and
    wherein the calcium lactate is a non-polymeric agglomeration agent for the calcium citrate microparticles.

2. The particulate composition of claim 1, wherein more than 90% of the particulate composition comprises particles having an average diameter from 50 μm to 300 μm.

3. The particulate composition of claim 1, wherein the calcium citrate microparticles have an average diameter from 1 μm to 10 μm.

4. The particulate composition of claim 1, wherein the particulate composition has an amorphous and/or crystalline form.

5. A process for producing the particulate composition of claim 1, wherein an aqueous solution of the calcium lactate comprising the calcium citrate microparticles is spray-dried to the particulate composition.

6. The process of claim 5, wherein the calcium lactate and the calcium citrate microparticles are agglomerated during spray-drying.

7. The process of claim 5, wherein the aqueous solution of the calcium lactate comprising the calcium citrate microparticles for spray-drying is produced by reacting lactic acid and citric acid with at least one compound selected from the group consisting of calcium oxide, calcium hydroxide, calcium carbonate, and calcium hydrogen carbonate.

8. The process of claim 7, wherein the process further comprises adding citric acid after the spray-drying.

9. The process of claim 5, wherein the aqueous solution for spray-drying is maintained at a temperature of 70 to 100° C. at a pH of 3.5 to 8.

10. The process of claim 7, wherein the reaction of the lactic acid and the citric acid with at least one compound selected from the group consisting of calcium oxide, calcium hydroxide, calcium carbonate, and calcium hydrogen carbonate is performed under high energy mixing.

11. A food product or beverage comprising the particulate composition of claim 1 as a calcium-enhancer.

12. The food product or beverage of claim 11, wherein the calcium-enhancer is used in fruit-based beverages.

13. Alimentary product comprising the particulate composition of claim 1.

14. Alimentary product comprising:
    calcium citrate microparticles having an average diameter from 0.1 μm to 20 μm, and
    dissolved calcium lactate.

15. Alimentary product of claim 14, which is a beverage.

16. Alimentary product of claim 14, which is a food product.

17. Alimentary product obtainable by combining the composition of any one of claims 1-4 with an alimentary product.

18. Alimentary product according to claim 17, wherein the alimentary product is a beverage or a water-containing food product.

* * * * *